(12) United States Patent
Liet

(10) Patent No.: US 10,674,675 B2
(45) Date of Patent: Jun. 9, 2020

(54) PROCESSING OF BLOCKS OR BALES OF FEED

(71) Applicant: Trioliet Holding B.V., Oldenzaal (NL)

(72) Inventor: Cornelis Hendricus Liet, Losser (NL)

(73) Assignee: Trioliet Holding B.V., Oldenzaal (NL)

(*) Notice: Subject to any disclaimer, the term of this patent is extended or adjusted under 35 U.S.C. 154(b) by 308 days.

(21) Appl. No.: 14/609,867

(22) Filed: Jan. 30, 2015

(65) Prior Publication Data
US 2015/0136886 A1 May 21, 2015

Related U.S. Application Data

(63) Continuation of application No. PCT/NL2013/050570, filed on Jul. 31, 2013.

(30) Foreign Application Priority Data

Aug. 1, 2012 (NL) ...................................... 2009261

(51) Int. Cl.
*A01F 29/10* (2006.01)
*A01F 29/04* (2006.01)
(Continued)

(52) U.S. Cl.
CPC ............ *A01F 29/10* (2013.01); *A01F 29/005* (2013.01); *A01F 29/02* (2013.01); *A01F 29/04* (2013.01);
(Continued)

(58) Field of Classification Search
CPC .......... A01F 29/01; A01F 29/02; A01F 29/12; A01F 29/04; A01F 29/10; A01K 5/005; A01K 5/0208; A01K 5/001
(Continued)

(56) References Cited

U.S. PATENT DOCUMENTS 4,187,990 A * 2/1980 Lundahl ............... A01D 90/105
241/101.3
4,195,958 A * 4/1980 Vahlkamp ............ A01D 87/127
241/101.71
(Continued)

FOREIGN PATENT DOCUMENTS

DE 20105747 U1 8/2002
EP 0506158 A2 9/1992
(Continued)

OTHER PUBLICATIONS

International Search Report and Written Opinion for corresponding foreign application PCT/NL2013/05070, filed Jul. 31, 2013.
(Continued)

*Primary Examiner* — Faye Francis
(74) *Attorney, Agent, or Firm* — Steven M. Koehler; Westman, Champlin & Koehler, P.A

(57) ABSTRACT

An apparatus and method for processing blocks or bales of feed includes a movable mixing bin and a store room with a fixed floor for one or more rows of the blocks or bales of feed. A separator is configured to feed the full length of a cutting face which extends downwards from the top of the block or the bale. A conveyor is configured to move the separator in the direction of the cutting face. A discharger moves separated feed to the mixing bin.

26 Claims, 12 Drawing Sheets

(51) Int. Cl.
*A01F 29/02* (2006.01)
*A01F 29/00* (2006.01)
*A01K 5/00* (2006.01)
*A01K 5/02* (2006.01)

(52) U.S. Cl.
CPC .............. *A01K 5/001* (2013.01); *A01K 5/002* (2013.01); *A01K 5/005* (2013.01); *A01K 5/0208* (2013.01)

(58) Field of Classification Search
USPC .......................................................... 241/605
See application file for complete search history.

(56) References Cited

U.S. PATENT DOCUMENTS

| | | | | |
|---|---|---|---|---|
| 4,420,119 A * | 12/1983 | Johnson | ............... | A01F 25/14 241/101.4 |
| 4,657,191 A * | 4/1987 | Dwyer | ............... | A01D 87/127 241/101.762 |
| 4,780,933 A * | 11/1988 | Pinto | ............... | D01G 7/04 19/80 R |
| 4,928,354 A * | 5/1990 | Hanselmann | ............ | D01G 7/10 19/80 R |
| 5,090,091 A * | 2/1992 | Temburg | ................ | D01G 7/04 19/145.5 |
| 5,090,629 A * | 2/1992 | Pinto | ............... | D01G 7/04 19/81 |
| 5,221,053 A * | 6/1993 | Pinto | ............... | D01G 7/04 19/80 R |
| 5,222,675 A * | 6/1993 | Stover | ............... | A01F 29/005 209/616 |
| 5,322,226 A * | 6/1994 | Kranefeld | ............. | D01G 31/00 19/80 R |
| 5,419,498 A * | 5/1995 | Rasmussen | ............ | D21B 1/08 241/280 |
| 5,452,861 A | 9/1995 | Faccia | | |
| 5,590,839 A * | 1/1997 | Condrey | .............. | A01F 29/005 241/186.35 |
| 5,615,839 A * | 4/1997 | Hartwig | .............. | A01F 29/005 241/260.1 |
| 6,109,552 A * | 8/2000 | Strankman | .......... | A01F 25/2027 241/101.72 |
| 6,227,468 B1 * | 5/2001 | De Baat | ................ | A01F 29/005 241/200 |
| 6,659,377 B1 * | 12/2003 | Coulter | ................ | E04F 21/12 241/236 |
| 6,685,120 B2 * | 2/2004 | Grellner | ............... | A01F 29/005 241/282.1 |
| 7,185,836 B2 * | 3/2007 | Simpson | .............. | A01F 15/005 241/30 |
| 8,371,791 B2 * | 2/2013 | Kenna | ................... | A01D 90/10 198/746 |
| 8,474,740 B2 * | 7/2013 | Neudorf | ............... | A01D 87/127 241/277 |
| 2002/0053614 A1 * | 5/2002 | Grellner | ............... | A01F 29/005 241/30 |
| 2003/0062433 A1 * | 4/2003 | Hughes | ............... | A01D 87/126 241/101.71 |
| 2003/0075629 A1 * | 4/2003 | Lucas | ................... | A01F 29/005 241/277 |

FOREIGN PATENT DOCUMENTS

| | | |
|---|---|---|
| EP | 0544640 A1 | 6/1993 |
| EP | 1449426 A2 | 8/2004 |
| EP | 1452087 A2 | 9/2004 |
| EP | 1625787 | 2/2006 |
| EP | 1625787 A2 | 2/2006 |
| EP | 2092819 A1 | 8/2009 |
| EP | 2140758 | 1/2010 |
| EP | 2140758 A2 | 1/2010 |
| EP | 2232982 A1 | 9/2010 |
| FR | 2874477 A1 | 3/2006 |
| NL | 1023476 | 11/2004 |
| WO | 9614735 A1 | 5/1996 |
| WO | 2009045158 A1 | 4/2009 |

OTHER PUBLICATIONS

Product brochure "Trioliet Livestock Feeding Equipment," printed Nov. 2010.
Magazine "Veehouderij Techniek," May 2012, pp. 31-33: "Lely voert automatisch".
Notice of Opposition filed Jun. 8, 2017 for European patent application No. 13747890.5.
Notice of Opposition filed Jun. 14, 2017 for European patent No. EP 2879483.
Interlocutory decision in opposition proceedings for European Patent Application No. 13747890.5, dated Apr. 30, 2019.

* cited by examiner

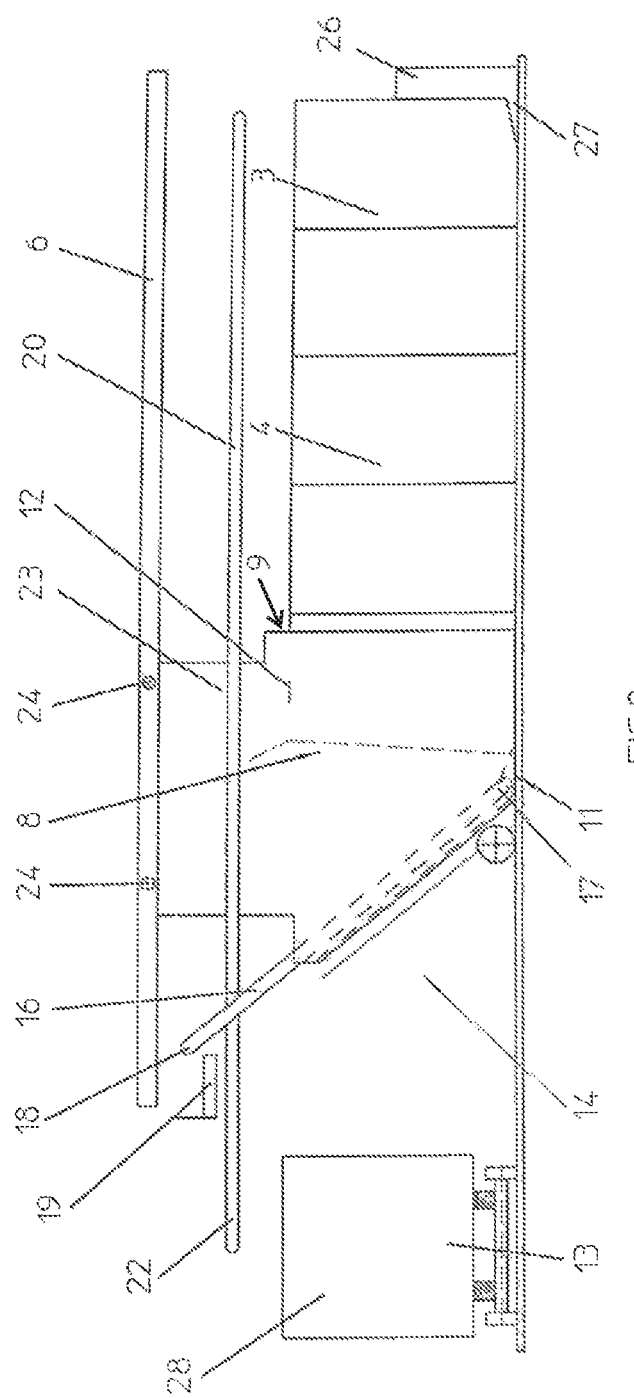

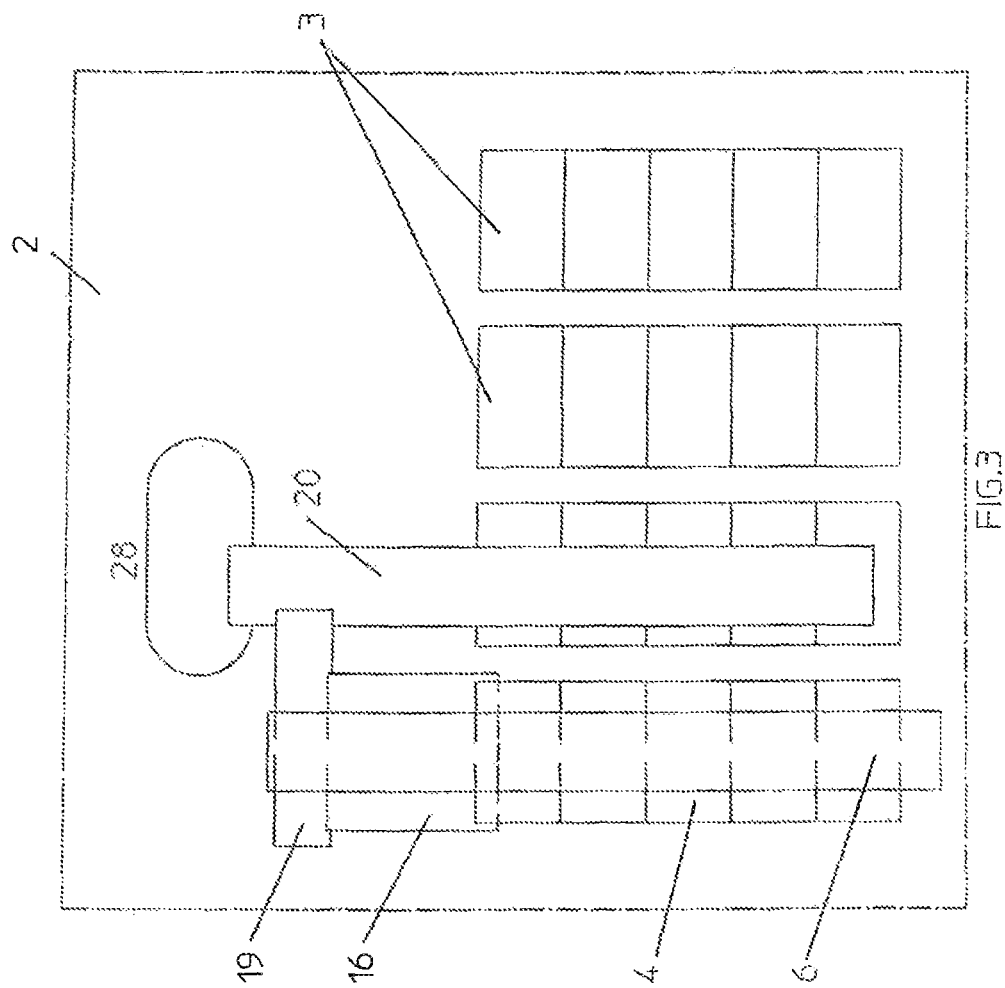

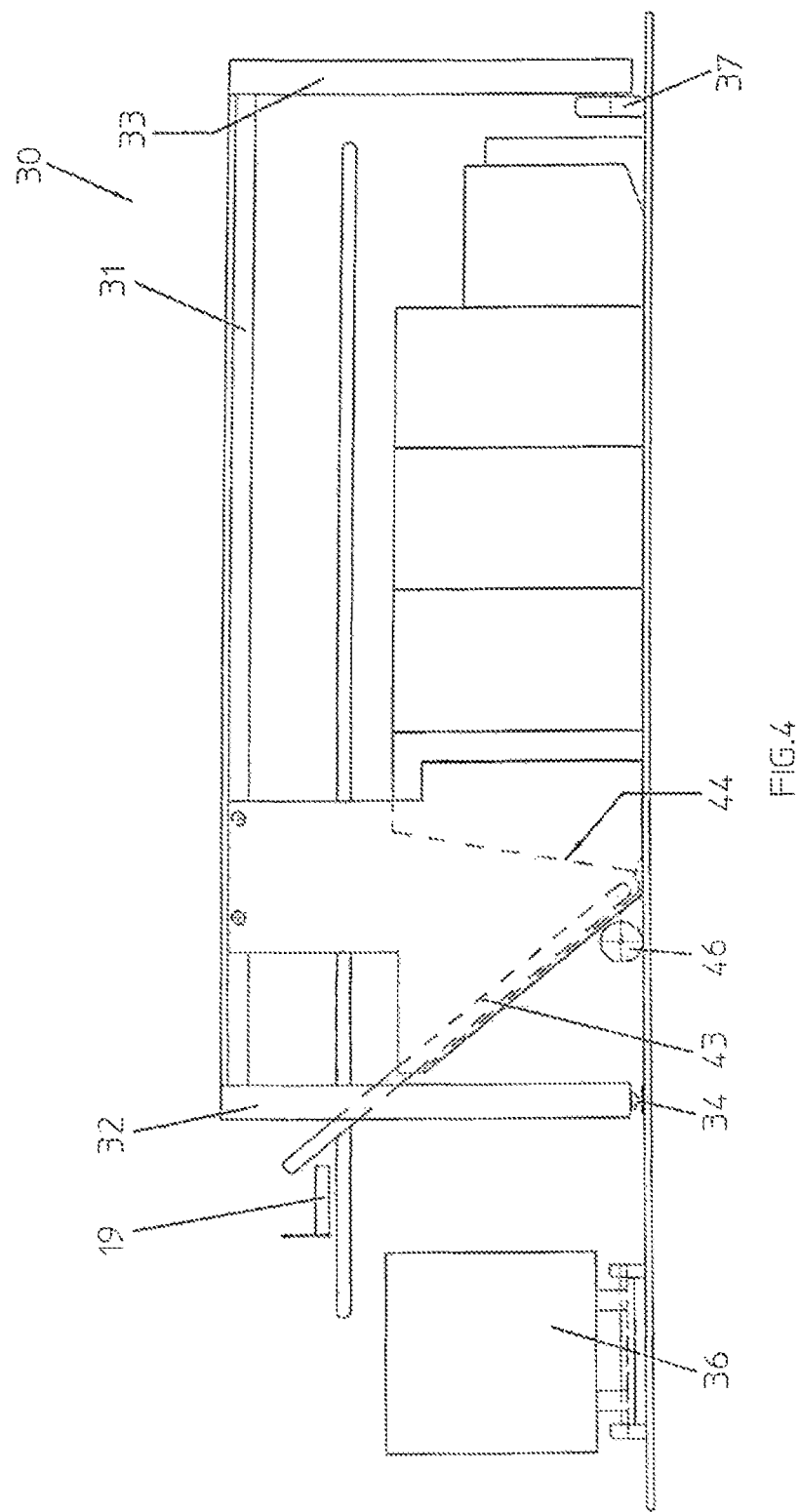

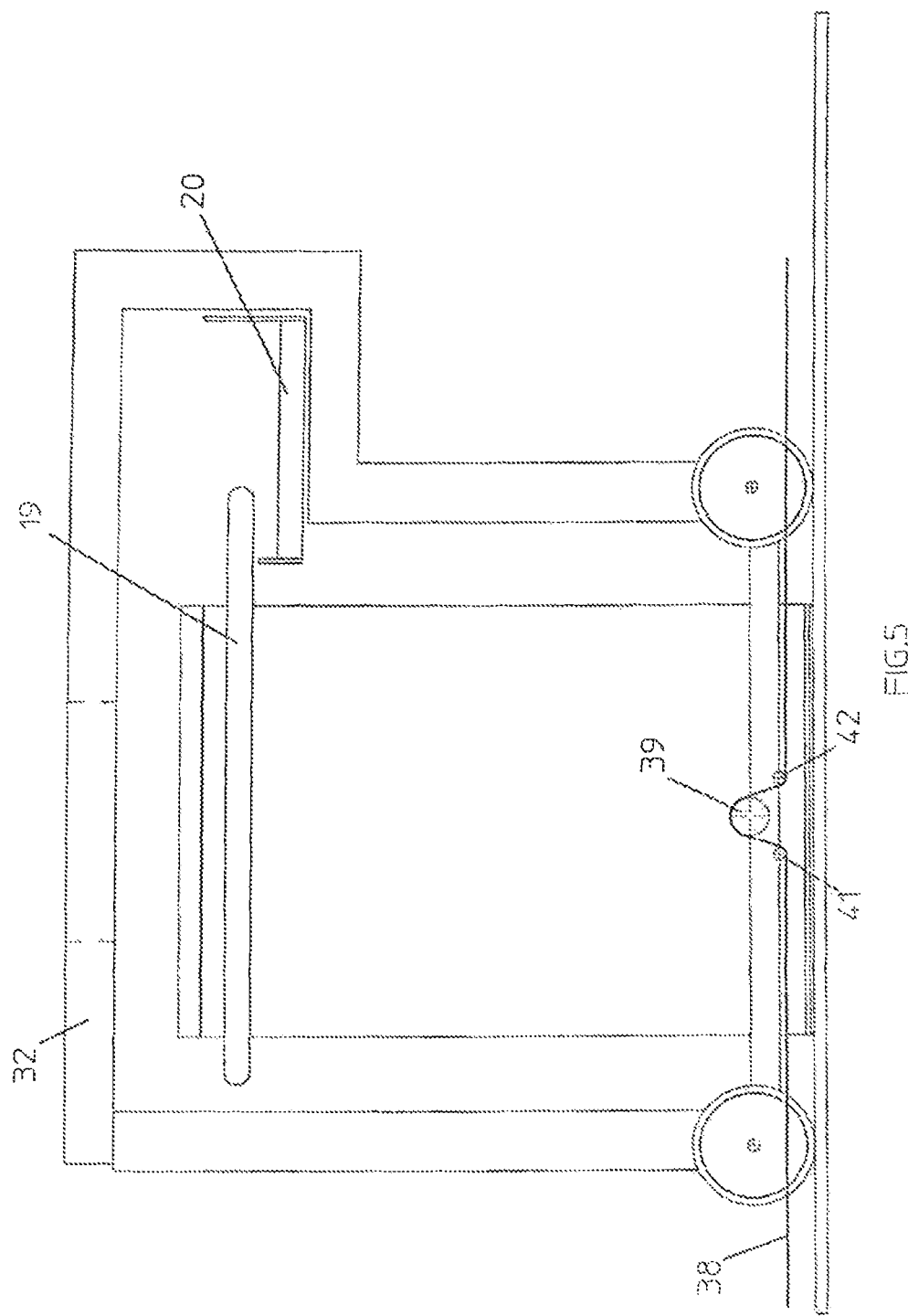

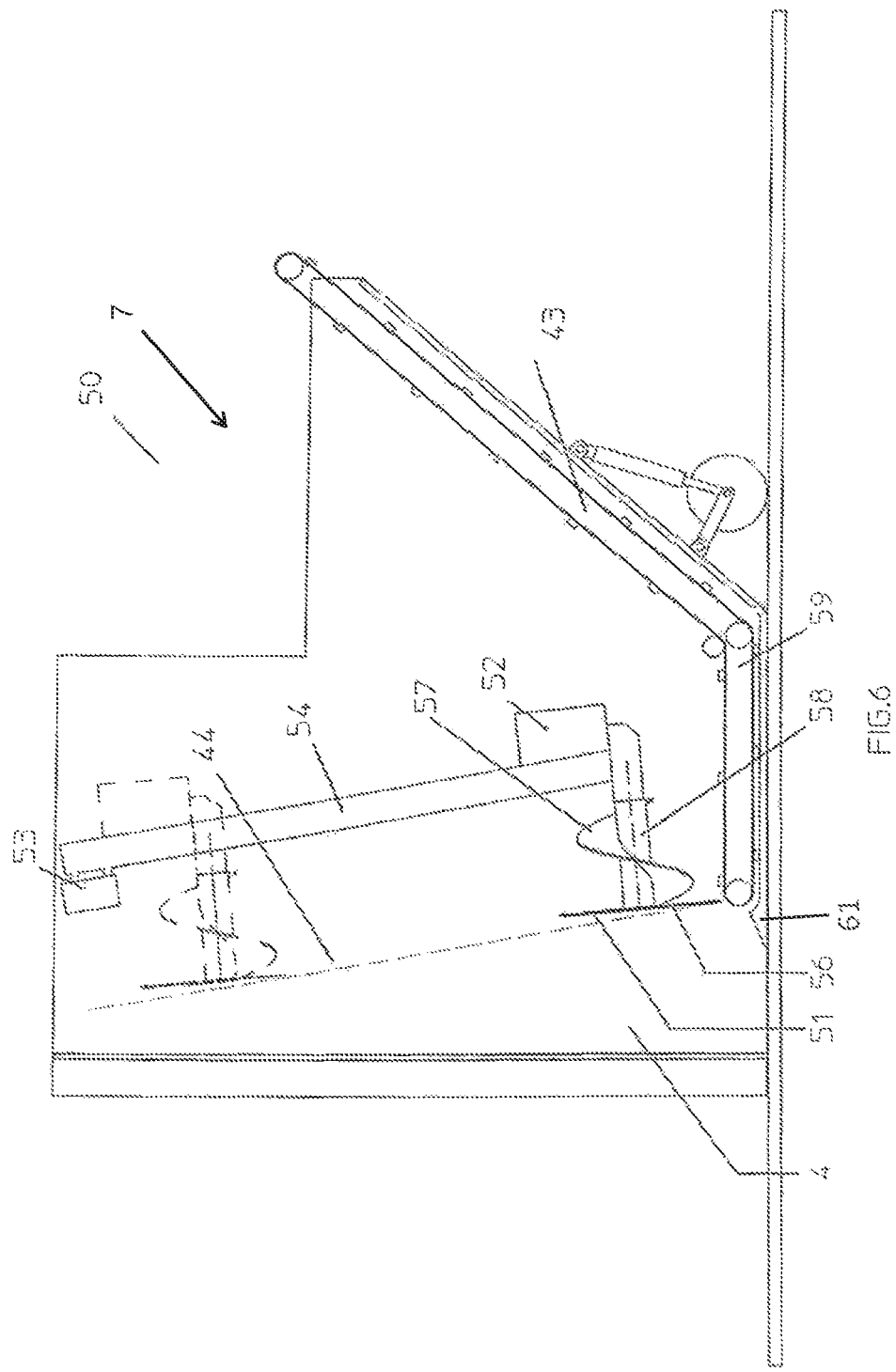

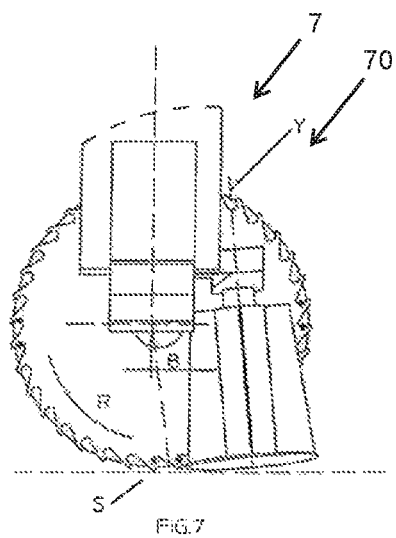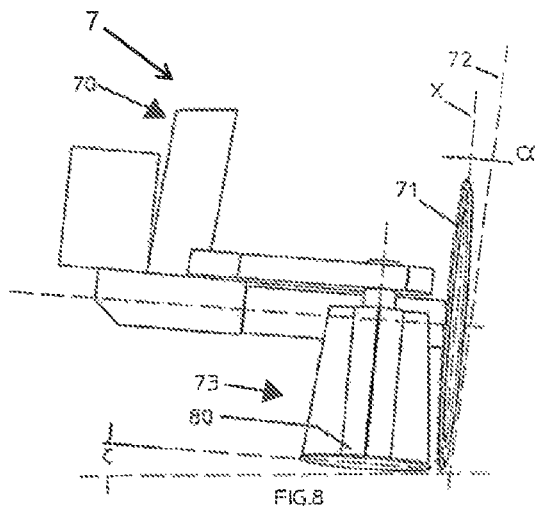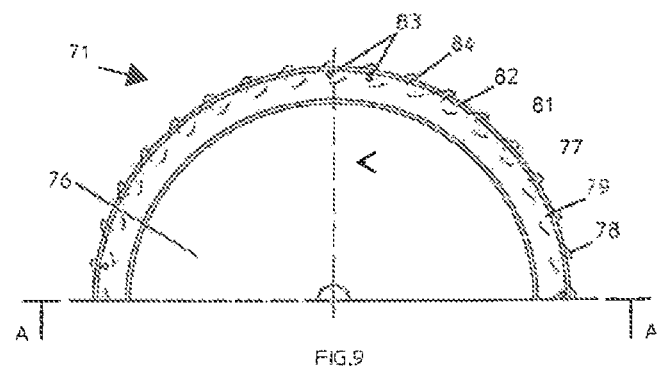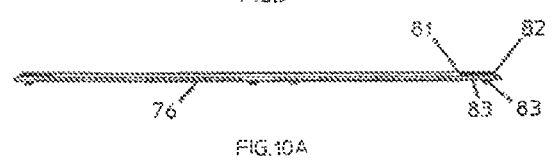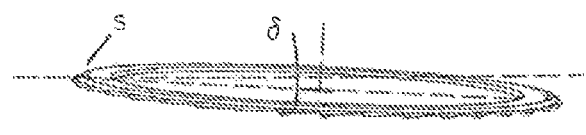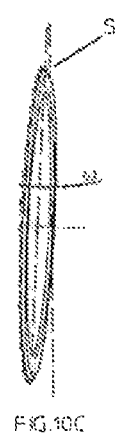

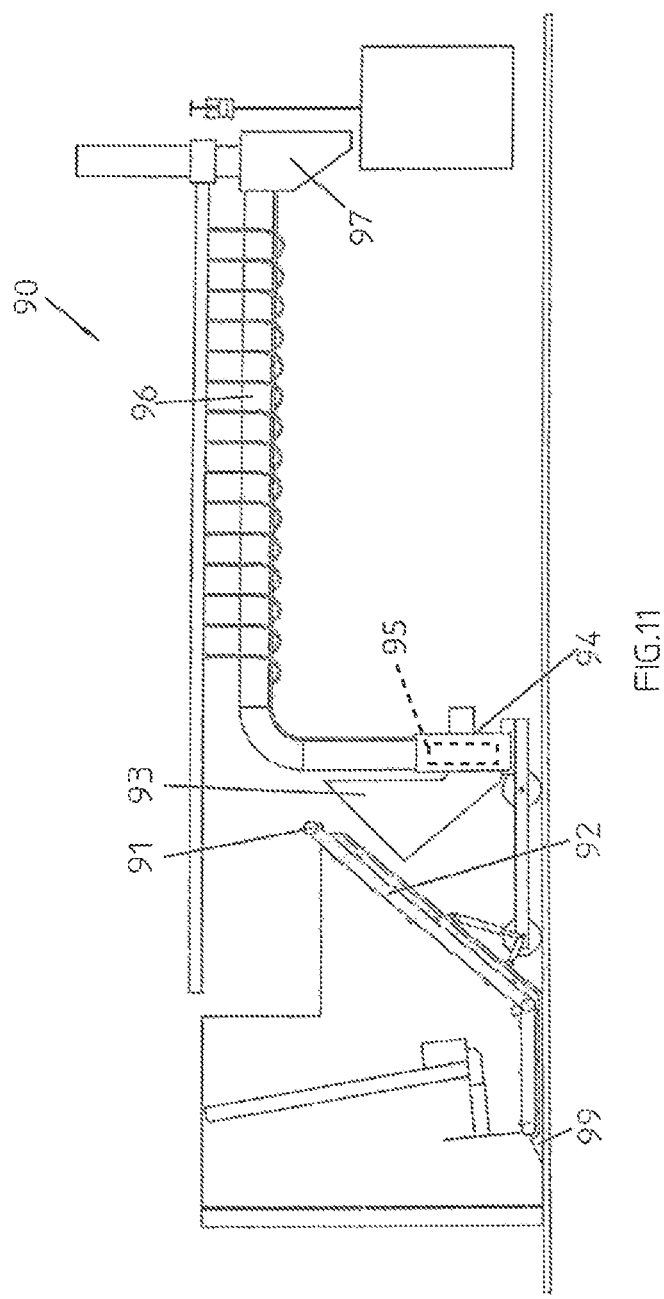

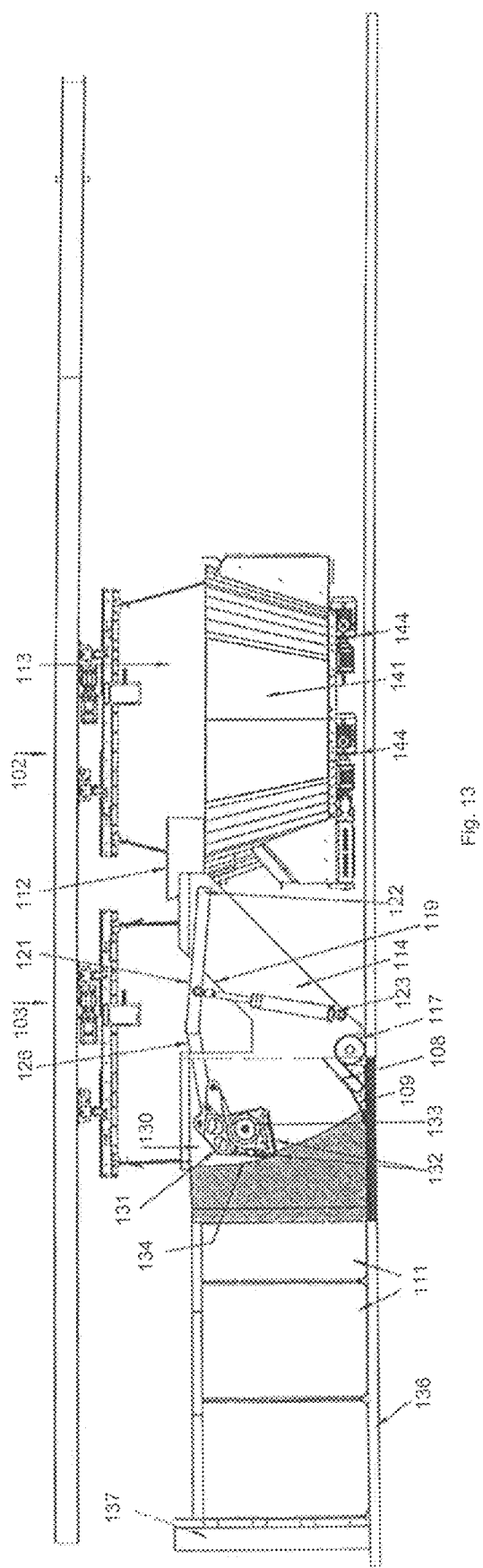

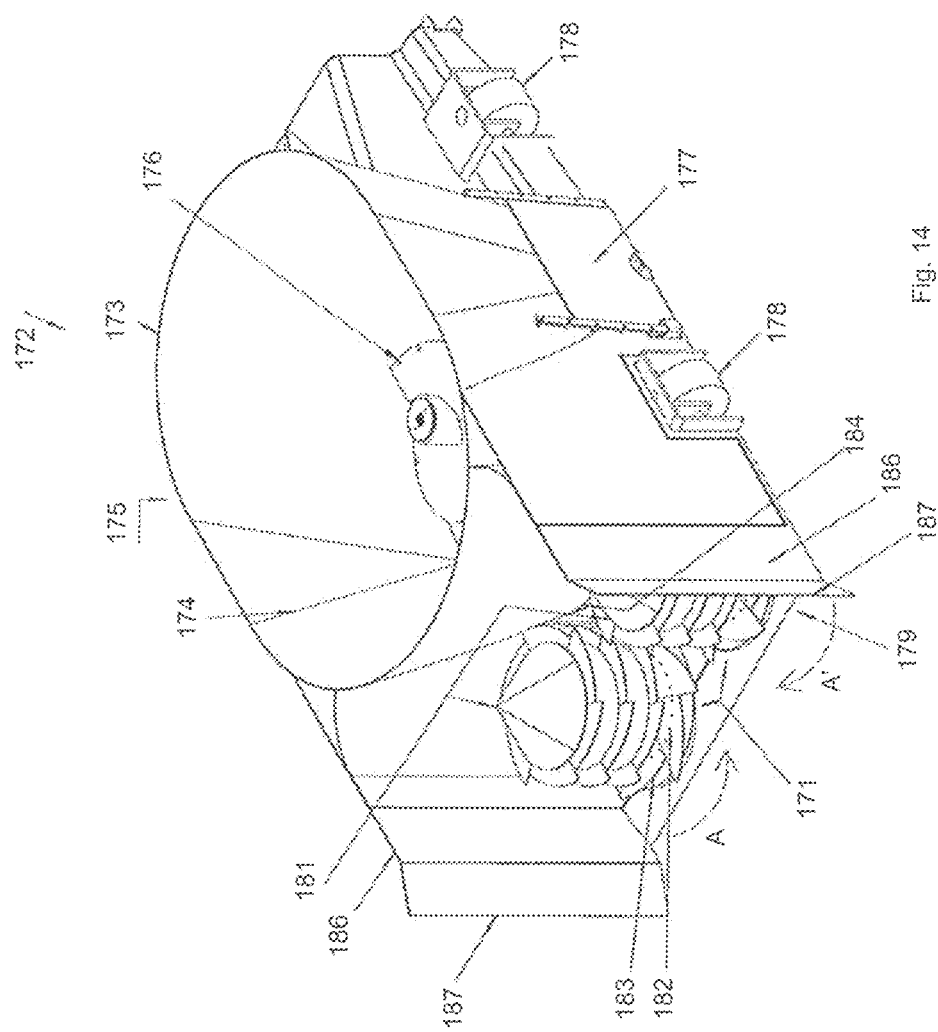

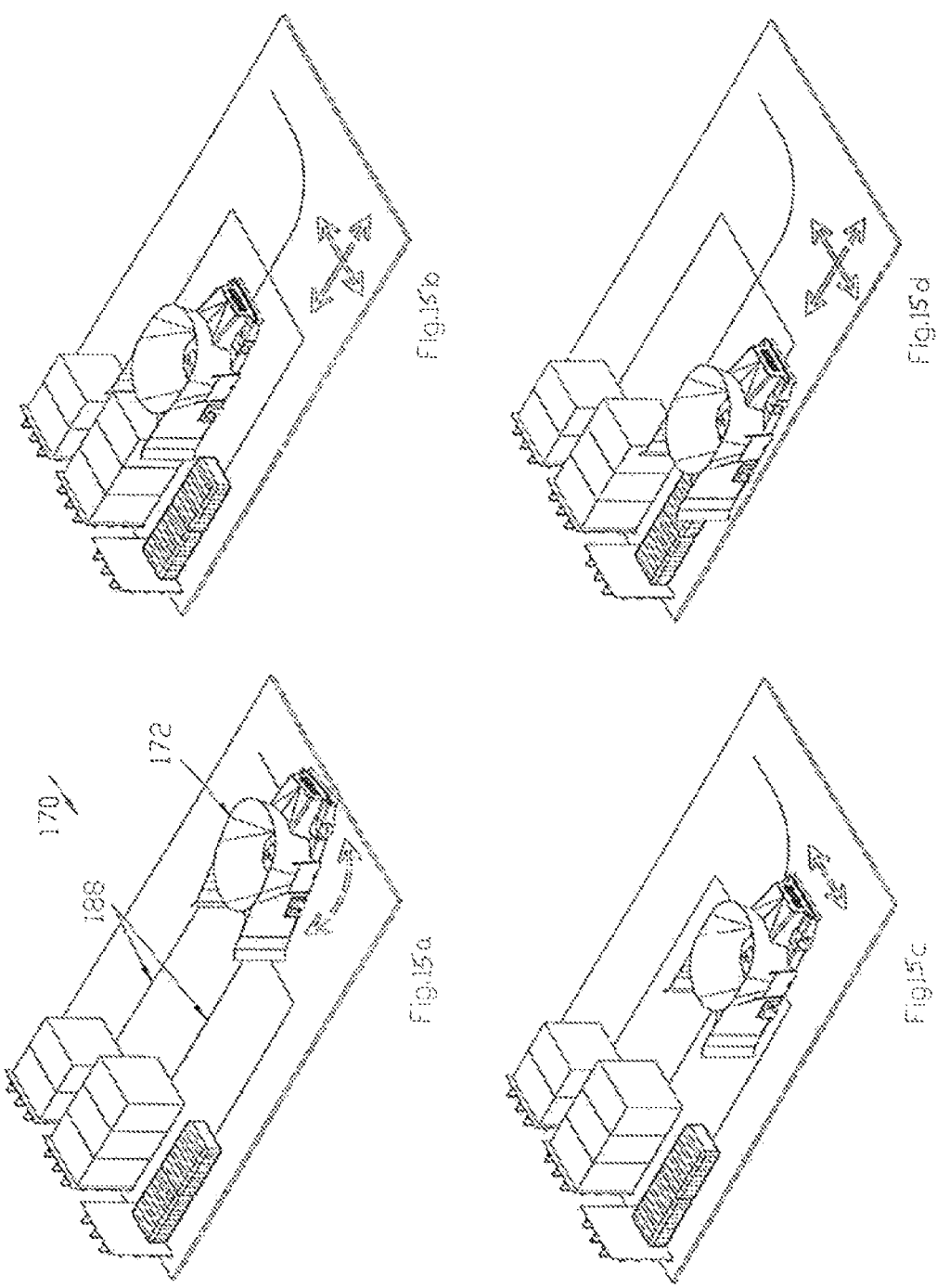

PROCESSING OF BLOCKS OR BALES OF FEED

CROSS-REFERENCE TO RELATED APPLICATION

The present application is a continuation of and claims priority of International patent application Serial No. PCT/NL2013/050570, filed Jul. 31, 2013, and published in English the content of which is hereby incorporated by reference in its entirety.

BACKGROUND

The discussion below is merely provided for general background information and is not intended to be used as an aid in determining the scope of the claimed subject matter.

Aspects of the invention relate to an apparatus and a process for processing blocks or bales of feed for livestock.

Silage can be made up of grass, mixtures of grass and clover, cereals such as wheat, barley or mixtures thereof or mixtures of cereals with peas or beans. Cut silage compacted in a silage pit is usually referred to as "blocks", while feed compacted in a baling press is usually referred to as "bales". On compacting a layered structure is formed.

Separating feed from a bale or block should be done in such a way that the structure of the remaining part of the block or bale remains intact and does not break off in order to prevent oxygen from intruding in the bale and setting decomposition processes in motion. Using a grabber can cause the blocks to break and fall apart, as a result of which the remaining feed will decompose more quickly. Also, such a grabber makes precise dosing impossible. Furthermore, feed will fall from the grabber when it is moved to the mixing carriage. Nor is the grabber able to properly pick the last remnants of the block off the floor. Feed remnants left behind may start to ferment and accelerate the spoiling of the other feed in the feed kitchen. Because of this the feed kitchen will need to be cleaned and filled on a regular basis.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An apparatus for processing blocks or bales of silage, includes a movable mixing bin, a store room with a fixed floor for one or more rows of the blocks or bales of silage and a separator for separating feed the full length of a cutting face, with the cutting face extending downwards from the top of the block or the bale. A conveyor moves the separator in the direction of the cutting face. A discharger moves separated feed to the mixing bin.

By using blocks or bales of silage, which will keep longer than silage which has not been compacted, larger stores, which need to be filled less frequently, can be put in the feed kitchen. The feed is separated from the block the full length of a cutting face which extends downwards from the top of the block or the bale. The cutting face thus is essentially vertical, for instance the full length of a side face or the full length of a front face or back face of the bale. The cutting face is disposed essentially transverse to the top and can for instance be vertical or at a slight angle of say less than 30 degrees, or less than 20 degrees to the vertical. The cutting face in that case can be essentially transverse to the layered structure of the block. Surprisingly, it has been found that this enables precise separating and dosing and that the block is slow to fall apart. Because the separator can be moved towards the cutting face, supply conveyers are no longer required. The bales or blocks can be placed on a fixed stationary floor, such as the fixed floor or ground of the store room, an intermediate floor or a pallet or similar stationary carrier.

The mixing bin and/or the discharger can be provided with a weighing device, so that the feed can be dosed precisely according to a predetermined recipe, in particular when the feed to be mixed is made up of various ingredients, to be separated from bales or blocks of different types of feed. The apparatus can be provided with a control unit for driving the separator, depending on the measured amount of separated feed in the mixing bin and/or feed on the discharge conveyors. The control unit can also be programmed to drive the mixing carriage and/or the separator along the various potential trajectories between the rows of blocks and the stable where the feed is dispensed to the livestock.

The store room or feed kitchen can be provided with one or more back walls or boards. The blocks and/or bales can be disposed between the back walls and the separator. The back walls support the bales or blocks during the cutting, which is especially relevant when the back block or bale is cut.

The discharger can for instance comprise a vertical conveyor moving in an inclined upward direction with a bottom end in the range of the bottom section of the cutting face, that is to say, in such a position that separated feed will end up on the bottom end of the vertical conveyor. The top end of the vertical conveyor can connect to an inlet or an open upper side of the mixing bin. In another embodiment the top end of the vertical conveyor can connect to a second conveyor belt. The second conveyor belt can be configured as a transverse belt with a conveying direction which is essentially transverse to the conveying direction of the vertical conveyor. A third conveyor belt can be disposed contiguous to the transverse belt, in which case the movable mixing carriage can be positioned beneath an end of the third conveyor belt.

In a further potential embodiment the discharger for moving separated feed to be mixing bin can for instance comprise a suction unit and/or a blowing unit.

In order to be able to mix different kinds of feed, the separator and the discharger can be movable among several rows of blocks or bales. Each row in that case will for instance comprise a single type of feed. The separator in that case can be part of a unit which can be moved separately from the mixing bin. The movable unit with separator can be provided with its own driving gear, or the unit can be driven by the mixing carriage. In another potential embodiment the separator can be carried by the mixing carriage.

In a potential embodiment the separator and the discharger can be movable by means of a roller guide along a support beam. The separator can be moved along the support beam in the direction of the rows, while the support beam together with the separator can be moved in transverse direction from one row to the other. The support beam can for instance be laterally movable by means of a guide on a support frame. In another potential embodiment the support beam can be mounted on a laterally movable supporting frame or cross-bar.

The apparatus can be provided with a shoveling plate extending beneath the separator at such a level that the shoveling plate can be slid beneath a bale. The shoveling plate can be used to wipe the floor and during the cutting the shoveling plate slid beneath the bale or the block can exert counterpressure. In a specific embodiment the apparatus can be provided on either side of the shoveling plate with parallel side walls which are spaced further apart than the width of the blocks of silage to be cut. The shoveling plate can for instance connect to the bottom end of a vertical conveyor or to an inlet of a mixing bin of the mixing carriage.

The separator can for instance be part of the mixing carriage, so that the number of individually movable parts of the system is limited. The maneuverability of such a self-propelling mixing carriage can be increased by providing the mixing carriage with swivel wheels, so that the mixing carriage can be moved in line with the rows as well as in transverse direction thereto. The mixing carriage can be provided with a shoveling plate which can be slid beneath a bale or block to be cut. The separator in that case can for instance consist of one or more rotors with a vertical rotor shaft and cutting organs. The cutting organs can for instance comprise cutting crowns with radial cutting edges disposed one above the other.

In a specific embodiment the separator can comprise a cutting apparatus which can be moved the full length of an essentially vertical or arched cutting face by means of one or more supporting arms.

In a specific embodiment the apparatus comprises a routing apparatus along which the mixing bin and/or the separator can be moved. Such a routing apparatus can for instance consist of a rail guide, such as an upper rail guide or a base rail guide, and/or a navigation system combined with a detector on the parts to be moved for identifying beacons along potential routes.

The described apparatus is especially suitable for utilization of a process for processing blocks or bales of silage, in which process the blocks or bales are arranged on a fixed floor and where feed is separated from a block or bale the full length of a cutting face extending downwards from the top of the bale or block. The separated feed is then discharged into a mixing bin of a movable mixing carriage and weighed, after which the mixing carriage moves to a feeding place and delivers the separated feed.

A feed mixture can be prepared according to a predetermined recipe or formula. This can be attained as follows: after feed has been separated from a first block, feed is separated from at least a second block of a different type of feed and then mixed in the mixing carriage with the feed from the first block. Using weighing device in the mixing bin and/or the conveyor belts makes it possible for the various ingredients to be precisely dosed according to the desired recipe in that case.

In an embodiment of the process, a row can be filled with new blocks or bales after a part, for instance at least 15-20%, of the feed of a last block or bale from the row has been separated. This can be done after separating a part of the last block or bale by moving it together with the back wall in the direction of the separator which have been returned to a starting position. The back wall is then removed, whereupon the row is filled with new blocks or bales, with the opened up back block now forming the front block. The back wall is then put back against the new last block or bale.

For a proper alignment of the rows, for instance when filling with new blocks, markings, such as marking lines, can be applied to the store room or feed kitchen floor. The marking lines for the various rows in that case can lie on a line, so that as a result the fronts of new or freshly filled rows will aligned in a line side by side. The marking lines can for instance consist of a front line, alongside which the front face of the front bale is arranged, and two side lines alongside which the side faces of the front bale are arranged.

If so desired, the bales to be processed may be tipped in such a way that the various layers are disposed parallel to the cutting face. This is particularly advantageous in the embodiment where the separator are part of the mixing carriage and consist of one or more rotors with a vertical rotor shaft and cutting crowns with radial cutting edges disposed one above the other.

BRIEF DESCRIPTION OF THE DRAWINGS

Aspects of the invention is further elucidated below with reference to the drawings, in which some embodiments are shown by way of illustration.

FIG. 2: is a representation of the apparatus of FIG. 1 in side view;

FIG. 3: is a representation of the apparatus of FIG. 1 in top view;

FIG. 4: is a schematic representation of a second potential embodiment of an apparatus;

FIG. 5: is a representation of the apparatus of FIG. 4 in front view;

FIG. 6: is a representation of a cutting unit of an apparatus;

FIG. 7: is a representation of an alternative embodiment of a cutting unit;

FIG. 8: is a representation of the cutting unit of FIG. 7 in side view;

FIG. 9: is a representation of a saw blade for the cutting unit of FIG. 7;

FIG. 10A: is a representation of the saw blade of FIG. 9 in cross-section;

FIG. 10B: is a schematic representation in top view of the position of the saw blade vis-à-vis the cutting face;

FIG. 10C: is a schematic representation in side view of the position of the saw blade vis-à-vis the cutting face;

FIG. 11: is a representation of a third potential embodiment of an apparatus;

FIG. 13: is a representation of the apparatus of FIG. 12 in side view;

FIG. 14: is a representation of a sixth potential embodiment of an apparatus;

FIG. 15A-D: is a representation of the apparatus of FIG. 14 in operation.

DETAILED DESCRIPTION OF THE ILLUSTRATIVE EMBODIMENTS

Figure 1:
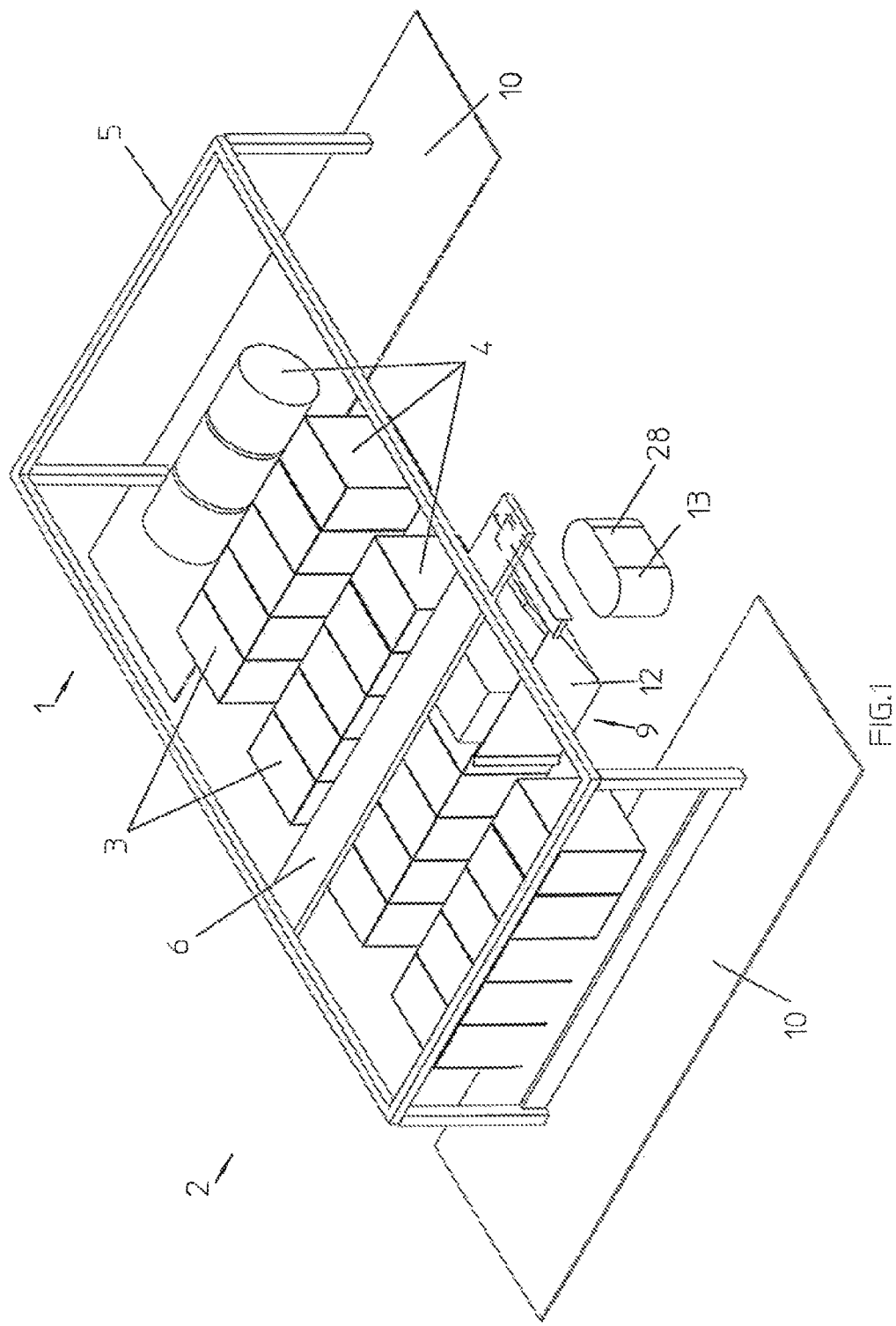
FIG. 1: is a schematic representation in perspective view of an apparatus.

FIG. 1 is a representation of an automatic feeding apparatus 1 with a feed kitchen 2 in which a number of parallel rows 3 of blocks 4 of silage are arranged on a fixed floor 10. In the feed kitchen 2 a supporting structure 5 is disposed, to which a laterally movable support beam 6 is connected which is essentially parallel to the rows 3. In the shown embodiment the support frame 5 is an XY-frame, from which the support beam 6 is laterally movably suspended. The apparatus 1 further comprises a cutting unit 7 (FIGS. 6-8), such as for instance a cutter or knife with or without a discharge mechanism, which can be moved the full length of an essentially vertical cutting face 8 (see FIG. 2) along a guide on the inside of a slide 9. The slide 9 comprises a bottom plate 11 positioned beneath the cutting unit 7 and two parallel side walls 12. The space between the side walls 12—and thus the width of the bottom plate 11—exceeds the width of the blocks 4, for instance the width of a block 4 multiplied by twice the tread width of the wheels of a tractor. Because of the extra-wide bottom plate 11 the floor beside the rows 3 is wiped clean and feed which on being separated falls beside the blocks is cleared away.

The apparatus further comprises a mixing carriage 13 and a conveyor 14 for moving separated feed from the slide 9 to the mixing carriage 13. The conveyor 14 comprise a vertical conveyor 16 moving in an inclined upward direction, with a bottom end 17 connecting the bottom plate 11 of the slide 9, and a top end 18 connecting to one end of a cross belt 19. The other end of the cross belt 19 connects to a third conveyor belt 20. The third conveyor belt 20 has an end 22 above the place where the mixing carriage 13 can be positioned. The slide 9 with the vertical conveyor 16 moving in an inclined upward direction and the cross belt 19 are connected to a suspension 23, which is coupled to the support beam 6 by means of a roller guide 24 6. At the end of the row of blocks 3 opposite the cutting face 8 there is a vertical end board 26, which is provided with a horizontal foot 27 moving in an inclined downward direction beneath the back bale of the row 3. The foot 27 can for instance be made up of forks, pins or a base plate.

The mixing carriage 13 is provided with a weighing bin 28 with a weighing device (not shown). In addition, the mixing carriage 13 comprises a control unit (not shown) for moving the mixing carriage 13, for instance along a guide or by means of a navigation system.

At a pre-programmed moment the apparatus 1 is activated for a new feeding round. The mixing carriage 13 is moved to a loading position beneath the end 22 of the third discharge belt 20. Next, the cutting unit 7 is activated from the control unit of the mixing carriage 13 and moved the full length of the cutting face 8 of the front block of the row 3. The separated feed is loaded by way of the vertical conveyor 16 and the cross belt 19 onto the third conveyor belt 20, which then deposits it into the mixing bin 28 of the mixing carriage 13. When the cutting unit 7 has passed the cutting face in full, the cutting unit 7 is returned to its starting position and the slide 9 with the cutting unit 7, the vertical conveyor 16 and the cross belt 19 is moved in the direction of the cutting face 8, after which the cutting unit 7 can again be moved the full length of the cutting face 8 until sufficient feed is present in the mixing bin 28.

Optionally, the conveyor belts 16, 19, 20 may also be provided with a weighing device. If sufficient feed is present in the mixing bin and/or on the conveyor belts, the cutting unit 7 is stopped. Once all the feed on the conveyor belts has been deposited in the mixing bin 28, the mixing carriage 13 can be driven to a next type of feed or to the stable.

The support beam 6 can now be moved laterally with the aid of driving device, such as a geared motor, to a next row of blocks 3 of a different type of feed, after which a required amount of the different type of feed can be separated in the same way and deposited in the mixing bin 28. Using the weighing device in the mixing bin 28 and/or the conveyor belts 16, 19, 20, a precise record can be kept of how much feed of each type has been deposited in the mixing bin and/or the conveyor belts. In this way a mixture can be prepared precisely according to a recipe entered into the control unit in advance.

When about 15% has been cut off the last bale or block in the row 3, the row 3 is filled with new bales or blocks. The slide 9 with the cutting unit 7 is first placed in a position furthest removed from the end board 26. Next, the end board 26 along with the remainder of the last bale is disposed in the direction of the slide 9, for instance up into the slide 9 or up to a marking line. When using a marking line, the fronts of the various rows can be mutually aligned. The back wall can for instance be moved using a silage cutter. Next, the foot 27 of the end board 26 is removed from beneath the last bale or block and the end board 26 is removed and temporarily set aside. The row 3 is now filled with blocks or bales up to the desired length. Finally, the end board 26 is replaced at the end of the filled row 3 with the foot 27 beneath the last bale or block.

FIG. 4 is a representation of an alternative embodiment in side view of an apparatus 30 with the support beam 31 extending fixedly between a front portal 32 and a back portal 33. The support beam 31 can be moved laterally together with the front and back portals 32, 33 as a single entity. The front portal 32 can be moved along a rail guide 34 on the side of the mixing carriage 36. On the other side the back portal 33 rests on wheels 37, which can for instance be provided with a brake (not shown) in order to block the wheels 37 when the portal 33 has been put in a desired position. The front portal 32 is shown in front view in FIG. 5. Using two side wheels 41, 42, a driving chain 38 is passed round a chain wheel 39 disposed between the side wheels 41, 42. The chain wheel 39 is driven, for instance by means of a geared motor (not shown). Such a guide enables very precise positioning of the portal 32, 33, thus reducing the risk that the cutting unit will get caught in the silage to be separated.

The vertical conveyor 43 is movable in the direction of the cutting face 44, as well as in lateral direction together with the support beam 31. The vertical conveyor 43 can be supported in that process by swivel wheels 46 capable of rolling in both directions.

An embodiment of the cutting unit 7 is shown at 50 is shown in greater detail in FIG. 6. The cutting unit 50 comprises a circular saw 51 which with the aid of a motor 52 can be moved forward and backward horizontally by way of a first guide 53 and can be moved by way of a second guide 54 between a top position (indicated by a dotted line in the figure) and a bottom position. The vertical guide 54 is parallel to the cutting face 44, which is rearwardly inclined at an angle. This helps to reduce or prevent the uncontrolled breaking off of feed.

The saw 51 comprises a circular saw blade 56 which is capable of rotation around an axis. The saw blade 56 is at an angle of about 5 degrees to the cutting face 44. A spiral 57 extends coaxially from the saw blade 56 in the direction of the vertical guide 54. The spiral 57 has a diameter which corresponds to the inner diameter of the saw teeth. The sawn-off feed is propelled by the spiral 57 in the direction of the vertical conveyor 43 moving in an inclined upward direction. The shaft of the spiral 57 is formed by a bushing 58 with a large diameter in order to prevent grass silage from getting stuck around the shaft. The bushing 58 rotates with the drive shaft. The long drive shaft creates space for the feed, which expands after it has been separated from the block.

The vertical conveyor 43 comprises a horizontal front section 59 and a shoveling plate 61 which extends from the horizontal section 59 of the vertical conveyor 43 and can be slid beneath the block 4 of silage.

During sawing the saw 51 is moved horizontally from one side of the cutting face to the opposite side. After each horizontal turn the saw 51 is moved downwards over a certain distance. In this way the saw 51 is moved from top to bottom in zigzag fashion.

Another potential cutting unit 7 is shown at 70 is shown in FIGS. 7 and 8. This cutting unit 70 comprises a circular saw blade 71, which is disposed at an angle α of about 1-6 degrees to the cutting face 72. At the back a tapered feeding-out roller 73 is disposed with a longitudinal axis Y which is essentially parallel to the centre plane X of the saw blade 71 and which is at an angle β of 1-6 degrees to the vertical (see FIG. 8). As can be seen in FIG. 7, the feeding-out roller 43 is disposed at a distance B from the center of the saw blade 71. The feeding-out roller 73 is disposed in the place of a section of the saw blade 71, which is present in the direction of rotation R behind the point S where the saw blade and the cutting face make contact (see FIG. 7). In this embodiment the point S is the bottom tip of the saw blade 71. The distance B corresponds to about 0.2-0.8 times, for instance 0.3-0.6 times the radius of the saw blade 71. Both in top view (FIG. 10B) and in side view (FIG. 10C) the saw blade 71 lies at a sharp angle Φ, ω to a vertical plane through the intersection S. These angles can for instance be 1-20 degrees, for instance 6-15 degrees, by which the saw blade 71 runs clear of the cutting face 72 as much as possible. The feeding-out roller 43 comprises a central shaft with blades or boards 74 which cast the sawn-off feed in the direction of the vertical conveyor. The blades 74 can for instance be radial straight boards or move spiral-wise to some extent.

The saw 71 is shown in greater detail in FIGS. 9 and 10. In the shown embodiment the saw 71 comprises a standard circular saw blade 76. The usual teeth 77 (represented by a dotted line) with saw teeth 78 are covered by a flat ring 79 with chamfered inner and outer sides 81, 82. The flat ring 79 is connected to the saw blade 71 with bolts 83. The tips of the saw teeth 78 are provided with cutting edges 84, which protrude from beneath the flat ring 79 in a desired length. Because of the teeth's short length the risk of the saw getting stuck is greatly reduced or even eliminated.

Another potential embodiment of an apparatus 90 is shown in FIG. 11. In this case the top end 91 of the vertical conveyor 92 moving in an inclined upward direction connects to a funnel 93 with an upper side which is as wide as the vertical conveyor 92. The funnel 93 leads to a fan housing 94 with a fan 95 which blows the supplied feed into a telescopically movable discharge pipe 96. The telescopically movable discharge pipe 96 at one end is hinged with respect to the fan housing 94, and at the other end it is hinged with respect to a cyclone 97 which delivers the feed from the discharge pipe 96 to a mixing carriage 98 disposed beneath it. The bottom end of the vertical conveyor 92 connects to a shoveling plate 99, which can be slid beneath the first bale or block from the row.

Figure 12:
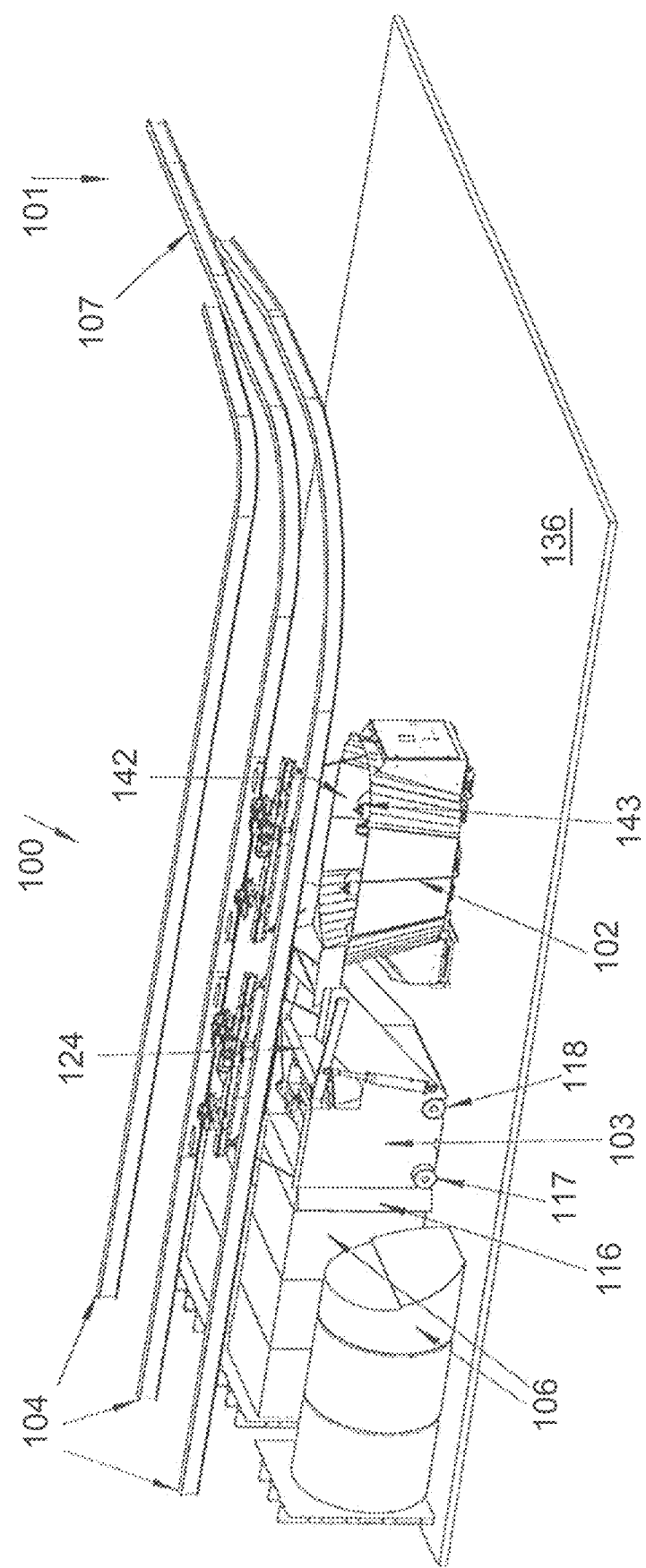
FIG. 12: is a representation of a fourth potential embodiment of an apparatus.

FIGS. 12 and 13 show a further potential embodiment of an apparatus 100 with a top rail guide 101 along which a mixing carriage 102 and a cutting carriage 103 can be moved. The rail guide 101 comprises a rail 104 at each row of blocks or bales 106. The rails 104 meet at a switch 107. When the cutting carriage 103 has to be moved from one row to the next, the cutting carriage 103 is moved together with the mixing carriage 102 to a position past the switch 107. The switch 107 is then set such that the cutting carriage 103 is guided to a next row when it is moved back. The mixing carriage 102 and the cutting carriage 103 in that case can be driven for instance by means of a sliding contact or with the aid of a battery. The carriages can be provided with an individual driving mechanism or with a joint driving mechanism.

The cutting carriage 103 comprises a vertical conveyor 108 moving in an inclined upward direction (see FIG. 13) with a bottom end connecting to a shoveling plate 109. The shoveling plate 109 wipes the floor clean en is slid beneath a bale or block 111 to be separated, in order to provide counterpressure during the cutting. The vertical conveyor 108 further comprises a top end connecting to a guide plate 112, along which feed can be deposited in a mixing bin 113 of the mixing carriage 102.

On either side of the belt 108 moving in an upward direction the cutting carriage 103 comprises a side wall 114. The two side walls 114 continue on both sides of the shoveling plate 109 up to a distance behind the back edge of the shoveling plate 109. The space between the side walls 114 is such that a bale or block 111 can be put between them with ample clearance. To this end the end edges 116 of the side walls 114 have been folded slightly outwards. On the underside the cutting carriage 103 is further provided with a pair of support wheels 117 near the folded end sides 116 and a second pair of support wheels 118 near the bottom end of the vertical conveyor 114. At the top the side walls are provided with a recess 119. On either side of the outer surfaces of the side walls 114 a lifting arm 121 is hinged to a hinged joint 122 near the top end of the vertical conveyor 123. The lifting arms 121 are interconnected at their free ends by means of a cross rod 124 (see FIG. 12). At the level of the recess 119 in the side walls 114 the lifting arms 121 can be moved up and down with the cross rod 124, for instance with the aid of hydraulic cylinders (not shown). On the sides of the two lifting arms 124 which face each other there is mounted on the cross rod a second pair of lifting arms 126 which extend essentially between the side walls 114. Between the free ends of these lifting arms 126 a cutting unit 130 is mounted with a frame 131, a knife 132 which is suspended inside the frame 131 with a downward-directed cutting edge. The knife 132 can be moved forward and backward with the aid of driving device (not shown). Behind the knife 132 a scraping-off roller 133 is suspended in the frame 131 to remove separated feed from the knife 132 and cast it in the direction of the vertical conveyor 108. As a result of the lifting arms 121 moving up and down vis-à-vis the hinged point 122 the knife 132 is moved the full length of the cutting face 134. The cutting face is curved but essentially vertical.

The bales or blocks 111 sit loose on a fixed floor 136, pushed together in a straight row. The last bale or block of the row is pushed against a fixed end board 137. The blocks or bales can be rectangular. Alternatively, round bales can be used.

The mixing carriage 102 has a mixing bin 140 with a closed upright wall 141 and an open upper side 142. In the mixing bin there are mixing screws 143. A driving device 144 is suspended from the underside of the mixing carriage 102 for driving the mixing screws 143. The mixing carriage 102 further comprises a weighing device (not shown) for weighing feed in the mixing bin and a control unit.

In the shown embodiment the mixing carriage 102 and the cutting carriage 103 are units that can be moved individually. In another potential embodiment the two parts can be configured as a single carriage.

In the embodiment of FIGS. 14 and 15A-D the apparatus 170 comprises separator 171 which are part of a self-propelling mixing carriage 172. There is no separate cutting carriage. The mixing carriage 172 comprises a mixing bin 173 with a closed upright side wall 174 and an open upper side 175. In the mixing bin 173 there is a rotatably driven mixing screw 176. At the side the mixing bin is provided with a closable outlet using a cover that can be slid away 177.

On the underside the mixing carriage 172 is provided with swivel wheels 178. This increases the maneuverability of the mixing carriage 172, which as a result can be moved as easily in longitudinal direction of a row as in transverse direction from one row to the next.

The underside of the mixing bin continues at the front and forms a shoveling plate 179, on which the separator 171 is disposed. The separator 171 is made up of two column-shaped rotors 181, each consisting of a number of star-shaped knives 182 with radial cutting edges 183 disposed one above the other. The two rotors 181 both rotate inwards with opposite rotational directions A, A', causing the separated feed to be conveyed inside in the direction of an inlet 184 of the mixing bin 173. The cutting action of such rotors 181 can be further enhanced by tipping the blocks or bales, with the layers ending up transverse to the longitudinal direction of the row. In this way the rotors 181 can separate the feed layer by layer and the risk of uncontrolled breaking off of the feed is reduced.

On either side of the rotor 181 the mixing carriage comprises a side wall 186, which connects to the wall 174 of the mixing bin 173. The space between the side walls 186 exceeds the width of the bales or blocks to be processed. The end sides 187 of the side walls 186 are folded outward under a slight angle.

The mixing carriage 172 is self-propelling and to this end comprises a control unit (not shown). The mixing carriage 172 can for instance be provided with a navigation system combined with a detector for identifying beacons along the potential routes between the desired loading and unloading stations. The mixing carriage can also be provided with a base guide 188, as shown in FIGS. 15A-D.

What is claimed is:

1. A process for processing a plurality of rows of loose and replaceable blocks or bales of compacted feed for livestock, the blocks or bales having a layered structure, the process comprising:
   providing the blocks or bales on a ground floor of a store room, each block or bale having an upwardly facing top surface and downwardly extending side faces, and wherein a last block or bale of a row is arranged against a movable back wall;
   providing a mover carrying a cutter for cutting feed from each block or bale;
   using the mover to move the cutter towards a side face of a selected block of bale;
   cutting feed from the selected block or bale at a starting position farthest from the movable back wall, wherein cutting is along said side face with the cutter by creating a cutting face which extends downwards from the top surface of the selected block or bale towards the ground floor, wherein cut feed separates from the selected block or bale along the cutting face, cutting feed includes cutting feed from the selected block or bale;
   receiving the cut feed on a conveyor;
   moving the cut feed with the conveyor to a movable bin;
   cutting feed from consecutive blocks or bales in the row until a part of the last block or bale in the row is cut;
   moving the cutter to the starting position after cutting feed from the last block or bale in the row;
   moving the last block or bale in the row together with the movable back wall in a direction toward the starting position;
   arranging new blocks or bales after the last block or bale in the row; and
   arranging the movable back wall so as to be against a new last block or bale in the row.

2. The process according to claim 1, and further comprising:
   after cutting feed from the selected block or bale, cutting feed from at least a second block or bale of a different feed than the selected block or bale;
   depositing the cut feed from the at least the second block or bale in the movable bin; and
   mixing the cut feed from the at least the second block or bale in the movable bin with the cut feed from the selected block or bale.

3. The process according to claim 1, wherein arranging blocks or bales of the row occurs after at least 20% of feed of the last block or bale has been cut.

4. The process according to claim 1, wherein the layered structure of the blocks or bales have layers arranged parallel to the cutting face.

5. The process according to claim 1, wherein the layered structure of the blocks or bales have layers arranged transverse to the cutting face.

6. The process of claim 1, and further comprising
   weighing the cut feed in the movable bin; and
   moving the movable bin with the cut feed to a feeding place to deliver the cut feed.

7. The process according to claim 1, wherein the cutter and the movable bin are separately movable.

8. The process according to claim 1, wherein the store room further comprises a guide along which the cutter is movable.

9. The process according to claim 1, wherein the store room is provided with one or more back walls located such that the blocks or bales can be arranged in a row between the one or more back walls and the cutter.

10. The process according to claim 1, wherein the conveyor comprises a vertical conveyor configured to move in an inclined upward direction with a bottom end at a level of the ground floor and a top end connecting to the movable bin or to a second conveyor belt.

11. The process according to claim 1, wherein the conveyor comprises a vertical conveyor configured to move in an inclined upward direction with a bottom end at a level of the floor and a top end connecting to a second conveyor belt, wherein the second conveyor belt has a conveying direction that is transverse to the conveying direction of the vertical conveyor.

12. The process according to claim 1, wherein the conveyor comprises a vertical conveyor configured to move in an inclined upward direction with a bottom end at a level of the ground floor and a top end connecting to a second conveyor belt, the second conveyor belt connecting to a third conveyor belt with an end beneath which the movable bin is positioned.

13. The process according to claim 1, wherein the cutter and the conveyor are movable by way of a guide along a support beam.

14. The process according to claim 13, wherein the support beam is laterally movable by way of a guide on a support frame.

15. The process according to claim 13, wherein the support beam is attached to a laterally movable portal.

16. The process according to claim 15, wherein the support beam is attached to a support frame which is laterally movable by way of a guide.

17. The process according to claim 1, wherein the movable bin includes a carriage, and the cutter is part of the movable bin or the carriage.

18. The process according to claim 17, wherein the carriage comprises a shoveling plate extending beneath the cutter at such a level that the plate is slid beneath a block or bale.

19. The process according to claim 18, wherein the shoveling plate connects to an inlet of the movable bin.

20. The process according to claim 19, wherein the cutter comprises one or more rotors with a vertical rotor shaft and knives, wherein the rotors are disposed before the inlet.

21. The process according to claim 20, wherein the knives comprise radial cutting edges disposed one above the other.

22. The process according to claim 1, wherein the store room includes side walls, the bales being disposed between the side walls, which are spaced apart further than a width of the blocks or bales to be cut, with the side walls extending to beyond cutting faces formed in the blocks or bales.

23. The process according to claim 1, wherein the cutter comprises a cutting unit which can be moved a full length of the block or bale by one or more movable supporting arms.

24. The process according to claim 1, wherein at least one of the cutter and the movable bin is movable by way of a rail guide.

25. The process according to claim 1, wherein the conveyor comprises a fan.

26. The process according to claim 1, wherein the ground floor of the store room is provided with markings configured for positioning rows of blocks or bales.

\* \* \* \* \*